(12) United States Patent
Williamson et al.

(10) Patent No.: US 8,392,995 B2
(45) Date of Patent: Mar. 5, 2013

(54) NETWORK MANAGEMENT

(75) Inventors: Matthew Murray Williamson, Palo Alto, CA (US); Andrew Patrick Norman, Bristol (GB); Jonathan Griffin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2821 days.

(21) Appl. No.: 11/033,182

(22) Filed: Jan. 11, 2005

(65) Prior Publication Data

US 2005/0172019 A1  Aug. 4, 2005

(30) Foreign Application Priority Data

Jan. 31, 2004  (GB) .................................. 0402060.8

(51) Int. Cl.
*G06F 11/00* (2006.01)
(52) U.S. Cl. ........................................................ 726/25
(58) Field of Classification Search .............. 726/22–26; 713/162
See application file for complete search history.

(56) References Cited

U.S. PATENT DOCUMENTS

| | | | |
|---|---|---|---|
| 6,647,400 B1 | 11/2003 | Moran | |
| 6,826,697 B1 | 11/2004 | Moran | |
| 6,988,208 B2 | 1/2006 | Hrabik et al. | |
| 6,996,843 B1 | 2/2006 | Moran | |
| 7,031,945 B1 | 4/2006 | Donner | |
| 7,032,114 B1 | 4/2006 | Moran | |
| 7,065,657 B1 | 6/2006 | Moran | |
| 2001/0034847 A1 | 10/2001 | Gaul | |
| 2002/0029275 A1* | 3/2002 | Selgas et al. ................... | 709/227 |
| 2003/0084320 A1 | 5/2003 | Tarquini et al. | |
| 2003/0126472 A1* | 7/2003 | Banzhof ........................ | 713/201 |
| 2004/0006704 A1* | 1/2004 | Dahlstrom et al. ........... | 713/200 |
| 2004/0088565 A1 | 5/2004 | Norman et al. | |
| 2004/0088581 A1 | 5/2004 | Brawn | |
| 2005/0005159 A1* | 1/2005 | Oliphant ........................ | 713/200 |

FOREIGN PATENT DOCUMENTS

WO  WO 01/90892 A1  11/2001

* cited by examiner

*Primary Examiner* — Beemnet Dada

(57) ABSTRACT

A method of operating a computing entity in a network having a log mapping computing entity network addresses to vulnerabilities, the method comprising the steps of: using the entity's network address, searching the log to establish what vulnerabilities the entity has; and if the log indicates the entity has a vulnerability, sending data identifying a user of the entity to an administrator of the network.

7 Claims, 3 Drawing Sheets

| PATCH | OPT-OUTS | REMINDER | DISCON. DATE |
|---|---|---|---|
| DB123456 | bj@hp.com | 10.10.2005 | 10.1.2006 |

| IP ADD. | ID |
|---|---|
| 192.168.0.1 | X@hp.com |
| 192.168.0.2 | y'@hp.com |
| 192.168.0.3 | bj@hp.com |
| xxx.xxx.xxx.xxx | |

NETWORK MANAGEMENT

BACKGROUND TO THE INVENTION

1. Field of the Invention

The present invention relates to the management or administration of a network of computing entities, and particularly to maintenance of the integrity of such a network against the ingress of computer viruses (which term is intended to be interpreted broadly to include, worms and other like code). Viruses, upon assimilation within a computing entity, typically cause a deleterious effect the nature of which varies from one virus to another. For example, a virus may affect the performance of the entity within which it has become assimilated (its "host entity") by deleting or corrupting data, or causing reductions in the performance of its host entity by taking up central processing capability. Alternatively, upon assimilation inside a host entity, a virus may affect the performance of one or more other entities in the network by causing its host entity to launch a denial of service attack, either on specified other entities, for example by bombarding them with traffic, for example, or generally upon the network as a whole, by, in combination with other infected host entities, causing the emission of a high level of traffic generally (i.e. not targeted at particular entities) on its network (whether via email or otherwise). Although these may be harmless to the network infrastructure per se, they act to debilitate the performance of either particular network entities or the speed generally of legitimate traffic.

New viruses are continually written to exploit newly discovered vulnerabilities in existing computing entities and updated or new systems. In response to the discovery of such viruses, providers of, for example, operating systems continually offer updated software releases, known as patches, to remedy the vulnerabilities. This cycle of vulnerability detection, followed by a processes of patching vulnerable computing entities is continual, and so it follows that computing entities must be patched regularly and promptly if successful viral attack is to be kept to a minimum.

2. Description of Related Art

Differing commercial organisations have different policies on the maintenance of what might, for the present purposes, be termed "network integrity", that is to say the continual and prompt patching of the various computing entities in a network. For example, an organisation such as a bank to whom security is paramount and in which each network user is likely to have a clearly defined set of tasks to perform will desirably have a clearly defined and homogeneous network in which users have little or no autonomy. In other words the number and location of computing entities on the network is static, all computing entities are the same and users are unable to decide for themselves which computing entity they are permitted to use, the configuration of their computing entity, its location within the network or the operations which are performed on it. By contrast, an establishment such as a research laboratory may have a relatively dynamic network having a significant variety of computing entities (e.g. different hardware and operating systems) and users who have significant levels of autonomy. In practice most networks will be administered in accordance with a policy of operation which falls somewhere between these two extreme examples. Additionally, in a network of significant size, it is highly unlikely that all network use will conform entirely with administrative policy, due to a combination of delinquent users and the acceptance of permissible exceptions which may arise as a result of either technical or organisational reasons.

In an attempt to deal with the threat of viral infection, network administrators probe computing entities which are connected to a network. The probing operation will usually reveal the configuration of the subject computing entity in elemental terms: its hardware; its operating system and version; other software applications such as those providing remote administrative access to the entity; and its Internet Protocol ("IP") address within the network, for example. Each element of an entity's configuration can then be mapped to known vulnerabilities to establish whether the probed entity is vulnerable to an attack, and thus whether it requires patching. Upon discovering one or more vulnerabilities within an entity an administrator may pursue a number of courses of action.

For example, in an 'authoritarian' network, a process of enforced patching may take place, in which an administrator causes patches to be downloaded and installed onto user entities via the network upon the discovery of vulnerabilities. Alternatively an administrator may perform the installation of patches manually, that is to say by attending the physical location of the user's computing entity. In a further alternative the user may have responsibility for acquiring and installing the appropriate patches, for example from a designated website. To implement any one of these courses of action it is desirable for the administrator to contact the user associated with the vulnerable computing entity ("associated user"). For example, in the case of automatic or enforced network patching, the subject computing entity may be running 'mission critical' software such as, for example, the monthly payroll, interruption of which at certain times (i.e. just before pay day) would be undesirable. By contacting the associated user of the entity an administrator is able to agree an appropriate time at which to perform a patching operation. In the case of a patching operation performed by an administrator at the location of the computing entity in question it is self-evident that the geographical location of the entity is required; normally this cannot be inferred from an IP address and so has to be obtained from the associated user. In the case of a patching operation to be performed by the associated user, the user must obviously be contacted in order to inform them of the need to install the patch. It is therefore desirable, in order efficiently to administer a network, to be able to contact the user of a computing entity via some medium other than the network itself. However, even in an organisation where the administrator is in possession of the identity and contact details of an associated user of a given computing entity, users move around within organisations, leave and are replaced by new users having different contact details.

It is possible, in many instances, to transmit messages directly from a administrator's computing entity to a user entity, which could request that the user contact the administrator (for example, either to arrange a time for patching to take place, or to request that the user performs the patching). While this may enable contact to be established with many users, it is not a reliable contact medium. For example in the case of a server computing entity, a message sent directly and intended to appear on its monitor is not likely to be seen by the associated user for some time, if at all, since the server is intended largely to run without manual intervention. Alternatively, a computing entity may have been left running, for example to perform an experiment, and the associated user may not return to view the monitor for some time.

SUMMARY OF THE INVENTION

According to a first aspect of the present invention there is provided a method of administering a network of computing entities comprising the steps of:

probing the network for vulnerabilities and generating a log of the or each vulnerability of an entity against its network address;

in response to a user query, searching the log of network addresses to establish what vulnerabilities the particular entity has; and receiving from the user, data identifying a user of the particular entity.

Preferably, using the user identification data, the administrator is then able to contact the user to arrange a time at which it is convenient to patch the entity; or to establish the geographical location of the entity; or to request that the user perform patching of the entity.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figures 1, 2, 4:
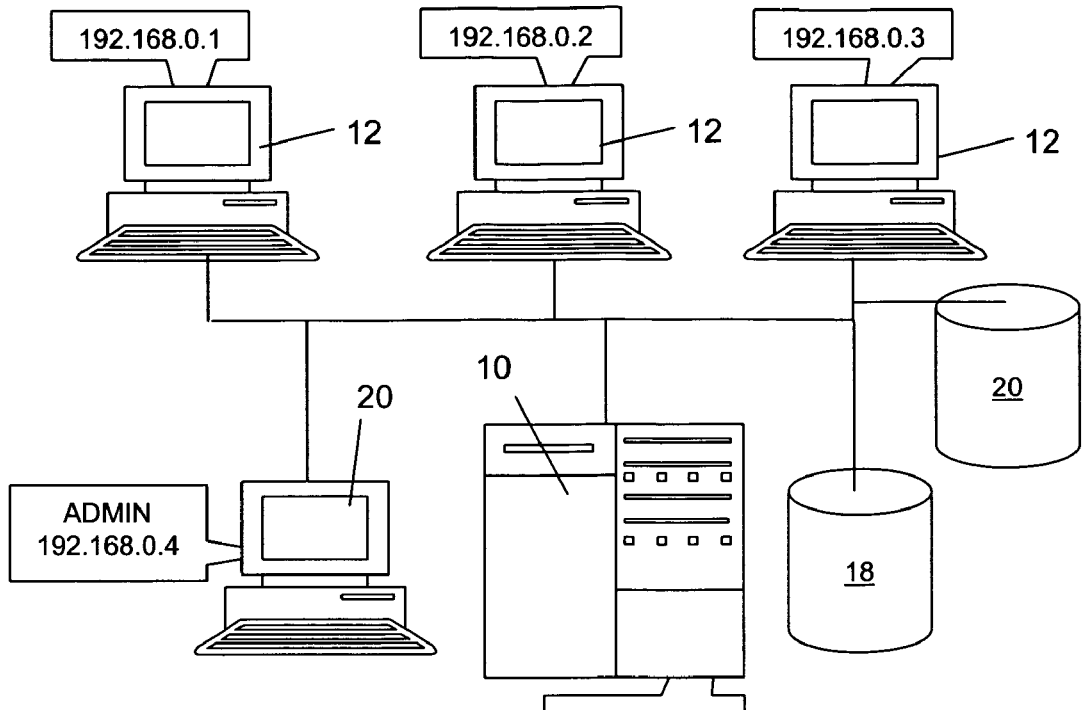
FIG. 1 is a schematic representation of a network.
FIG. 2 is a tabular representation of a log mapping IP Addresses to vulnerability information.
FIG. 4 is a tabular representation of patch status log.

Referring now to FIG. 1, a network, which may typically, but not necessarily, be an intranet of a commercial organisation, has a plurality of user computing entities—including a server entity 10 and several client entities 12, and an administrator computing entity 16. Technically speaking there is, in the illustrated example, no fundamental difference between the client entities 12 which are operated by users, and the administrating entity, operated by an administrator; the difference therefore lying in the functions the entities perform (and therefore, inter alia, the software they are likely to carry). Each of the entities 10-16 has a network address, in this example an Internet Protocol address. In addition the network includes two databases: a vulnerability database 18 and a patching database 20, both of which will be discussed in more detail subsequently. Secondly the network includes a patching database 20 which records, against the IP address of the computing entity probed, the vulnerabilities detected, again using the patch ID.

In order to maintain the integrity of the network's resistance to viral attack, the administrator continually probes entities in the network, to establish whether they are vulnerable. One form of probing involves simply sending messages to an entity at a particular network address, for example requesting a connection, to an application within an entity using a particular application level protocol, i.e. a protocol which specifies rules according to which two applications on different computing entities communicate and whose identity is specified by a parameter known as a "port number". Frequently an automatic response of the program implementing the application level protocol concerned is to send a response identifying its version number etc. For example one program which behaves in this way is Secure Shells (SSH) program providing remote administrative access, typically for computing entities running UNIX operating systems. The identity of each of the various computing elements discovered during probing of a particular entity (for example the version of a particular software application or operating system which it is running) is then mapped to the vulnerabilities of that element which are known to exist using the vulnerability database 18, which records each vulnerability of a computing element using the identifier of the patch ("patch ID") which remedies it. All the vulnerabilities retrieved for all of the elements detected are then entered into the patching database 20 against the IP address of the machine on which they were discovered.

Alternatively, another way of probing, shown in our co-pending U.S. application Ser. Nos. 10/287,125; 10/287,101; and 10/345,701 (each of which are hereby incorporated by reference) transmits benign viruses throughout the network. These viruses behave, during ingress into an entity, in the same manner as their malicious counterparts, but once inside, merely operate to send a message to the administrator to indicate that they have succeeded in entering a given entity. The identity of the benign virus, having been created specifically to manifest a particular vulnerability, is thus directly indicative of that vulnerability and so responses from a given benign virus indicate directly the nature of the vulnerability without need for recourse to the vulnerability database 18, and these are then entered into the patching database 20. Details of probing operations, not being germane to the present invention, will not be discussed further.

Referring now to FIG. 2 a tabular representation of the patching database 20, records the IP Address of vulnerable computing entities against patch ID, i.e. the identity of a software patch, which when correctly installed, provides resistance to the vulnerability in question. Thus, in the illustrated log the entity having the IP address 192.168.0.2 is listed as having no vulnerabilities (as indicated by "NONE"), whereas the entity having the IP address 192.168.0.3 is listed as having vulnerabilities corresponding to patches KB828035 and DB123456.

Having gathered data relating to vulnerability it may, depending upon the configuration and policy of the network being administered, be possible for an administrator to engage in a forced patching exercise, automatically causing each computing entity in the network to which the administrator has administrative access, to install the relevant patches for the vulnerabilities detected. However, such a patching policy does not take account of differing commercial imperatives which may operate in relation to different entities. Thus for example it may be that a particular computing entity is performing such a critical and/or valuable function that it is judged preferable to leave it un-patched and therefore vulnerable, rather than take the entity down for the time required to install the patch. This may, for example, be a state of affairs which exists only for a relatively short period of time, after which the entity in question has ceased performing critical activity, and it would be expedient to patch it. In such a situation it is therefore obviously both desirable and commercially sensible to defer patching of the entity until such a time as is commercially convenient. Such decisions however are not necessarily capable of being made without consulting a user of the entity in question (for example, the date to which patching is advantageously deferred is unlikely to be stored within the computing entity or even if it is, may not be either readily accessible to an administrator, or apparent to them), and while it is a trivial matter for one computing entity to establish the IP Address of another, establishing either the geographical location of the entity, or the identity of its associated user is much more difficult.

Similarly, in the case of patching operations which are to be performed either autonomously by the user or by an administrator at the geographical location of the entity, it is necessary to identify and contact the user.

Figure 3:
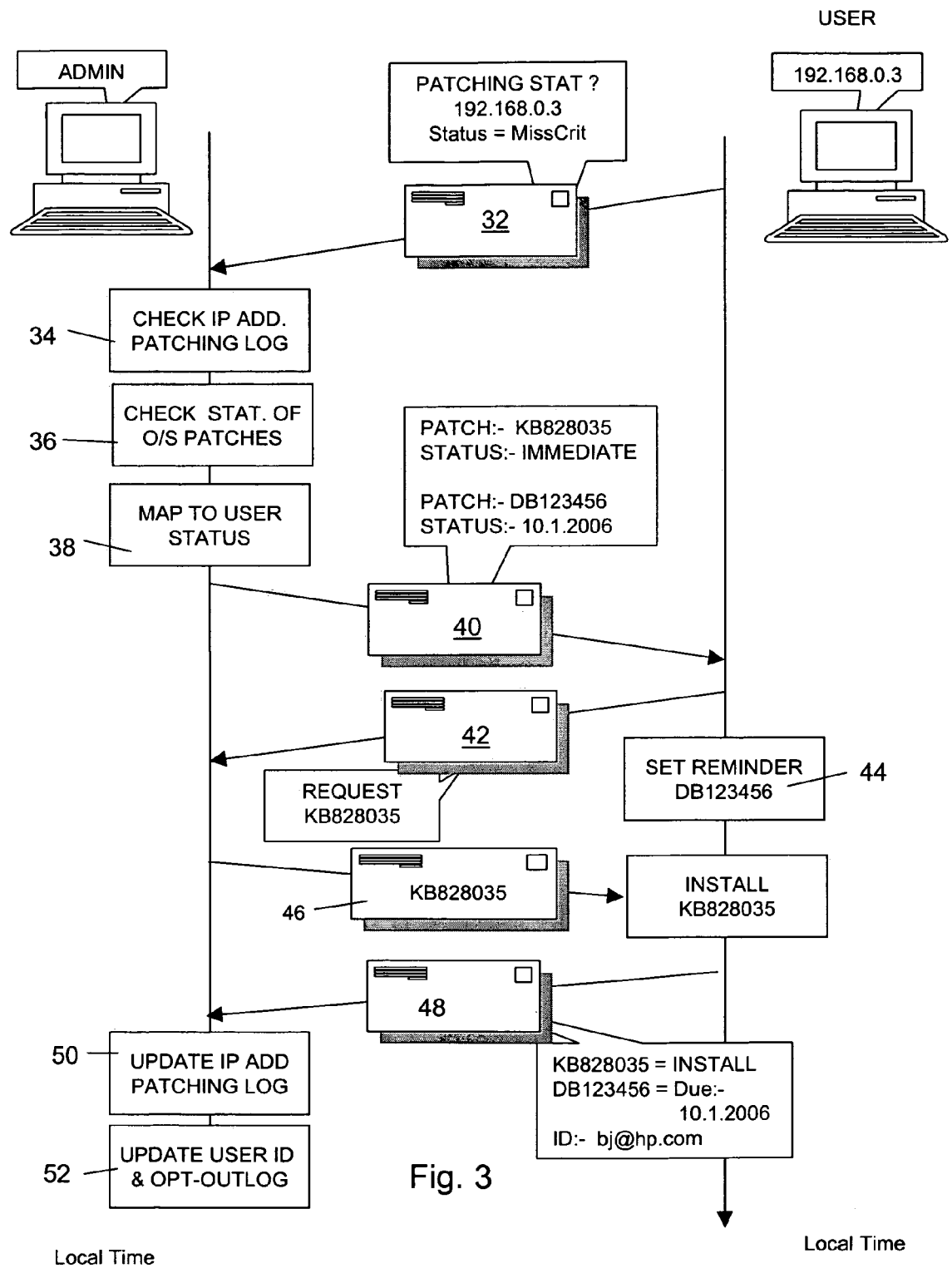
FIG. 3 is a flow diagram of a polling and patching operation.

Referring now to FIG. 3, a user computing entity 12 is adapted, on a regular basis (for example once per day), to poll the log 20, shown at step 32 in FIG. 3, in order to establish whether any vulnerabilities have been detected which map to its IP Address. The polling request therefore includes the IP address of entity 12, together with a status badge which in this example indicates that it has a "Mission Critical" status; in other words the operation of the entity in question is, while the badge is set to that status, regarded as critical. Upon receipt of the polling request 32 the administrator computing entity 16 checks the log 20 at step 34 to establish whether any vulnerabilities are mapped to the IP address 192.168.0.3. From log 20 it can be seen that two vulnerabilities have been detected, corresponding to patches KB828035 and DB123456. The admin entity 16 then, at step 36, checks the status of each of the patches in a patch status log, shown in FIG. 4, which maps patch identity to exempted categories of entities which are to be permitted either to defer installation, or avoid it altogether. For example in the log of FIG. 4, there are no exempted categories for patch KB828035, while entities with mission critical status are exempt from installation of patch DB123456 until 10.1.2006, and entities whose status is ZARG, which in the present example is a status connoting entities running (fictitious) ZARG software are exempt entirely from installing patch ZZZXXYY (reasons for this may include the software provides automatic patching which might be compromised by installing the designated patch, or alternatively because the of commercial imperatives that require the entity to be taken down only in extremis).

Having established the status of the patches which map to the IP Address in the log 20, at step 38 the Administrator then maps the user status to the or each status of the identified patches using the status badge from the entity 12, and establishes that patch KB828035 requires immediate installation for all computing entities regardless of status, while for an entity of mission critical status patch DB123456 must be installed by 10.1.2006, and at step 40 sends this data to the entity 12. The entity 12 then requests patch KB828035 at step 42, and at step 44 sets a reminder to install DB123456 on a deferred date prior to the due date of 10.1.2006. At step 46 the patch KB828035 downloads from the administrator (or some other repository, as appropriate) and is installed. Once installation is complete and the reminder has been set, the updated status data regarding the two patches (i.e. the one installed and the one deferred) is sent to the administrator at step 48, together with user identification data 50, in this example simply the email address of a user of the entity 12 (to be recorded by the administrator to enable them subsequently to contact the user). Upon receipt of the update, the administrator updates, at step 50, the log 20 to reflect that the entity 12 is no longer vulnerable to the virus requiring patch KB828035. At step 52 the administrator creates an entry in an opt-out log shown in FIG. 5, which is essentially a diary of user ID's, patches and due dates by which the patches must be installed on entities for which the users have identified, thus ensuring that on subsequent occasions when the user checks the patching log it will reflect that this patch still needs to be installed. Secondly and also at step 52, the administrator updates a user ID log shown in FIG. 6, which maps user ID to IP address.

The example described above relates to a network in which each computing entity has a static IP Address. However many networks adopt a protocol known as Dynamic Host Control Protocol (DHCP), in which IP Addresses are assigned by a DHCP server to a computing entity when the entity connects to the network. As a result a particular entity may connect to the network on two different occasions (separated, quite possibly, only by a matter of minutes) and be assigned a different IP Address on each occasion. The mapping of vulnerabilities to IP Addresses in a network running DHCP therefore requires, for each entry of an IP Address where a vulnerability has been located, a record to be kept of the date and time of detection of the vulnerability, in order that a computing entity who has been assigned the particular IP Address is able to establish whether the vulnerability relates to it or another entity which was also assigned the IP Address in question at a different time.

Figures 5, 6, 7:
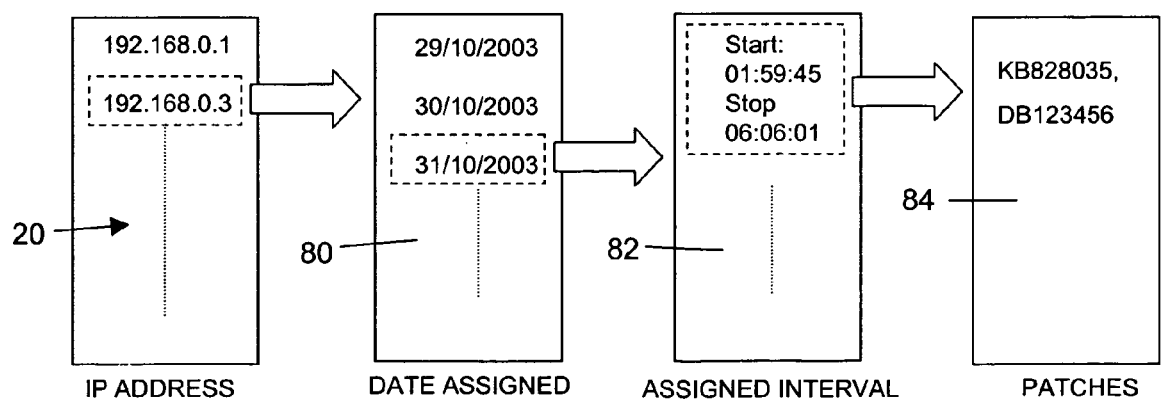
FIG. 5 is a tabular representation of a record of deferred patches mapping to user ID's
FIG. 6 is a tabular representation of a record mapping user IDs (here email addresses) to IP Addresses.
FIG. 7 is a tabular representation of a series of records which enable mapping between an occasion of allocation of a particular IP Address and vulnerabilities detected by an entity having the IP Address on that occasion.

Referring now to FIG. 7, for each IP Address in the log 20 in respect of which a vulnerability has been detected, the administrator, by virtue of its connection to the DHCP server, records all the dates on which that IP Address was assigned, in a related table 80. Further, for each date in the table 80 on which the IP Address was assigned there is recorded, as a single entry in a further table 82, the times on that date on which the IP Address was acquired and released. In other words, the combination of tables records each occasion on which a particular IP Address was assigned. Vulnerability data in the log 20 is then recorded against each occasion (i.e. an IP Address, date and time period of its assignment). A table set identical to the first three tables shown in FIG. 7 are recorded in the computing entity (which is able to do this since it itself is aware of when a particular IP Address was assigned to it and released by it).

Thus, in a network using DHCP, the polling step 32 in FIG. 3 includes the step of sequentially matching the contents of the three tables held in the computing entity with the contents of the three tables held on behalf (but not necessarily by) the administrator in order to determine whether vulnerabilities detected in respect of a given IP Address correspond to an occasion on which the IP Address in question was held by the computing entity performing the polling step 32.

The embodiment described in connection with FIG. 3 illustrates a scenario in which network users have a high degree of autonomy, i.e. responsibility for patching their computing entities is placed in their hands. The present invention is equally applicable to a scenario in which enforced patching is performed remotely by an administrator, with the user information being used by the administrator to establish, for example, a convenient time to patch the entity, having regard to, say, the mission critical nature of the computing it performs. In such a scenario the vulnerabilities are similarly recorded against IP address in the patching database 20. The associated user checks this database, for example upon logging on to the network, and when vulnerabilities are detected, leaves contact details to enable an administrator to contact them in order, for example, to initiate a negotiation regarding a suitable time for performance of a patching operation by the admin. Alternatively enforced patching can take place automatically having regard to the user contact and status details indicating, for example, the mission critical nature of the operations performed on the entity in question.

In an further embodiment, patching of a user computing entity is performed by an administrator at the geographical location of the entity. In such a case the user may search the patching database 20 to determine which vulnerabilities are present, and then contact the administrator with this information and the relevant contact details so that the administrator can attend their computing entity to perform the patching. Alternatively the user may simply send the administrator their IP address and contact details and the administrator maps the IP address (taking into account DHCP complications where appropriate) to the vulnerabilities and performs the patching at the site of the user entity.

The invention claimed is:

1. A method of operating a computing entity in a network having a log mapping computing entity network addresses to vulnerabilities, the method comprising the steps of:
   using the entity's network address, searching in a computing device the log to establish what vulnerabilities the entity has; and
   in response to the log indicating the entity has a vulnerability, sending data identifying a user of the entity to an administrator of the network.

2. A method according to claim 1 further comprising the step of sending data indicating a status of the entity to the administrator.

3. A method according to claim 2 further comprising the step of receiving from the administrator a deadline for patching of the vulnerability.

4. A method according to claim 1 wherein: network addresses are allocated dynamically; for each occasion of allocation of a network address the log indicates the allocated address and the date and time of allocation; and the log additionally maps vulnerabilities to occasions of allocation of addresses.

5. A method according to claim 4 further comprising the step of receiving a dynamic network address for the entity, and for each occasion of allocation, recording, at the entity, the date and time of an address' allocation and the date and time of its release.

6. A method according to claim 5 further comprising the step, using the entity's recorded date and time of allocation of a particular network address, of searching the log for an occasion of allocation of the particular network address which matches an occasion of allocation of the particular address recorded by the entity, thereby to establish what vulnerabilities in the log map to occasions of the entity's use of the particular address, and hence, to the entity itself.

7. A computer non-transitory readable medium storing a computer program product for use on a computing entity within a network having a log mapping computing entity network addresses to vulnerabilities, the program when executed by a computer causes the computer to:
   using the entity's network address, search the log to establish what vulnerabilities the entity has; and
   in response to the log indicating the entity has a vulnerability, send data identifying a user of the entity to an administrator of the network.

* * * * *